United States Patent [19]

Onuma

[11] Patent Number: 4,506,708

[45] Date of Patent: Mar. 26, 1985

[54] AIR PRESSURE FILLING SYSTEM FOR TIRES

[75] Inventor: Masashi Onuma, Aichi, Japan

[73] Assignee: Toyota Jidosha Kabushiki Kaisha, Toyota, Japan

[21] Appl. No.: 446,611

[22] Filed: Dec. 3, 1982

[30] Foreign Application Priority Data

Dec. 4, 1981 [JP] Japan .................................. 56-195791

[51] Int. Cl.³ ............................................. B65B 31/00
[52] U.S. Cl. .......................................... 141/4; 141/38; 141/129; 141/144
[58] Field of Search ................... 141/38, 99, 129, 144, 141/145, 197, 237, 268, 270, 279, 283, 301, 302, 304, 4–7

[56] References Cited

U.S. PATENT DOCUMENTS 2,695,122 11/1954 Legrman ............................. 141/197
3,207,189 9/1965 Vergobbi ............................. 141/302
3,259,152 7/1966 Schimkat ......................... 141/144 X Primary Examiner—Stephen Marcus
Attorney, Agent, or Firm—Kenyon & Kenyon

[57] ABSTRACT

An air pressure filling system for tires includes a rotary table receiving a plurality of tires arranged in a circle. A rotary distribution joint is placed over the rotary table and is connected to an air source through a pressure control device for controlling an air pressure of the tires at a predetermined pressure. A plurality of air hoses are connected to the rotary distribution joint at one end thereof and are adapted to be connected to the tires by an operator at the other end thereof. The operator simply keeps one place where he is able to connect the hoses to the tires one by one while the tires are transferred on the rotary table, and the tire filled with a predetermined air pressure is returned the operator.

2 Claims, 7 Drawing Figures

FIG. I
PRIOR ART
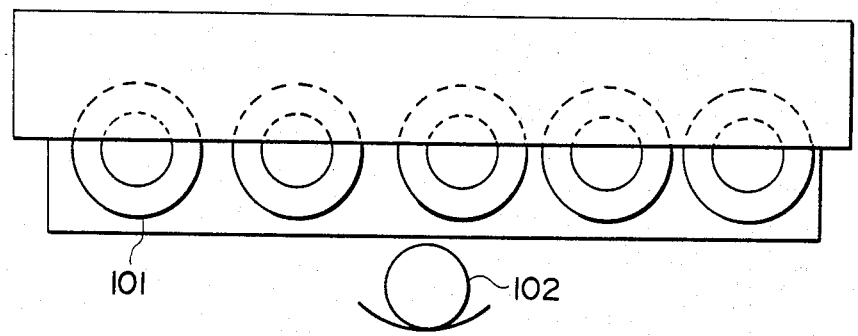
FIG. 2
PRIOR ART
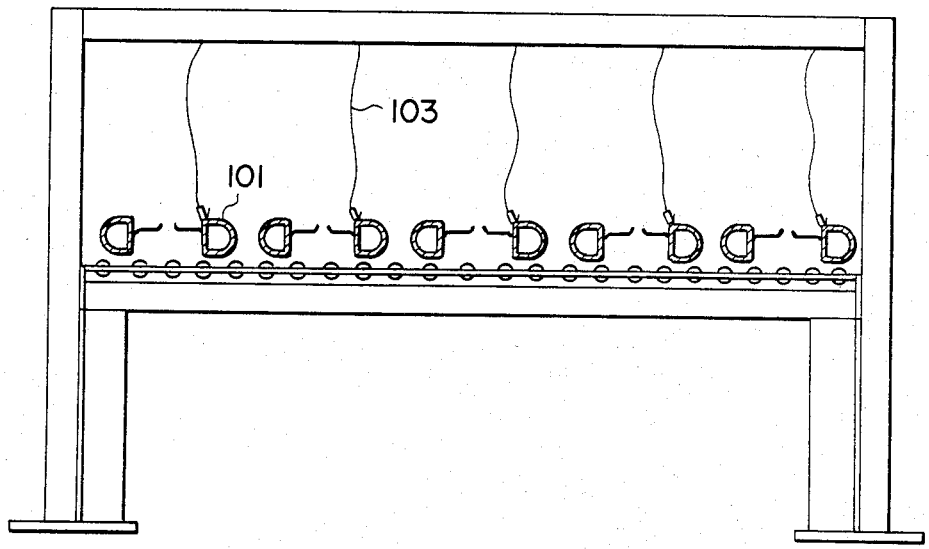

AIR PRESSURE FILLING SYSTEM FOR TIRES

BACKGROUND OF THE INVENTION

1. Field of the Invention

This invention relates to a rotary type air pressure filling system for filling tires with a specified air pressure in a tire assembly line in an automobile production line.

2. Description of the Prior Art

An air pressure filling system for tires in the automobile production line is adapted to fill tires with air pressure after a disk wheel is assembled to the tires in a tire assembly line, and the air pressure filling system usually includes a pressure control device to control the air pressure thus filled to a specified pressure and a conveyor to transfer the tires. This system is used for filling a tire having a tube with air pressure, or for bleeding air pressure from a tubeless tire (for example, air is extracted from a tire having an air pressure of 3.5 $Kg/cm^2 \sim 4.0$ $Kg/cm^2$ to a specified pressure of 1.8 $Kg/cm^2$) and so forth.

However, the air filling and air extracting by use of the conventional system takes much time, for example, requires about 60 sec. per tire. In consequence, to provde properly inflated tires for one vehicle (five tires) takes about 300 sec., thus resulting in reduced productivity to a considerable extent.

Now, to solve this problem, it has been the practice, as shown in FIGS. 1 and 2, to arrange a plurality of tires 101 in a line, and an operator 102 simultaneously performs the air pressure filling and air pressure extracting, thus trying to shorten the operating time.

FIG. 1 is a schematic plan view of an example of the prior art, and FIG. 2 is a schematic front view thereof. According to this method, a plurality of tires are arranged on a straight-line conveyor, and the operator 102 connects air hoses 103 extending from an air control device of the air filling system to the tires one by one to fill or extract the air pressure.

Since the plurality of tires are arranged in a straight line, in the case of tires of 14 inches radius, the distance from the first tire to the fifth tire amounts to about 3 meters, thereby presenting the disadvantage of wasting working time for the worker 102, who has to cover the distance for the connection of the hoses. In order to solve this problem, the tires should be reduced in number. However, if the tires are reduced in number, then the productivity declines.

SUMMARY OF THE INVENTION

The present invention has been developed to obviate the above-described disadvantages of the prior art and has as its object the provision of an air pressure filling system for tires capable of saving walking of the operator and improving the productivity to a considerable extent.

According to the present invention, the tire air pressure filling system comprises air hoses to supply air pressure to tires; a rotary distribution joint; a pressure control device combining an air pressure switch, a solenoid valve, a timer and a throttle valve combined together to control air filling pressure; a carry-in bed and a carry-out bed for carrying in and out the tires; and a rotary table disposed close to a space between the beds. The rotary table is controlled such that, when one tire is carried in, then one tire is carried out, whereby the operator is permitted to work in a predetermined position and a plurality of tires are filled up with air pressure at once.

BRIEF DESCRIPTION OF THE DRAWINGS

FIG. 1 is a schematic plan view showing the conventional tire air pressure filling system;

FIG. 2 is a schematic front view of the same;

DESCRIPTION OF THE PREFERRED EMBODIMENT

Description will hereunder be given of an embodiment of the present invention with reference to the drawings.

Figure 3:
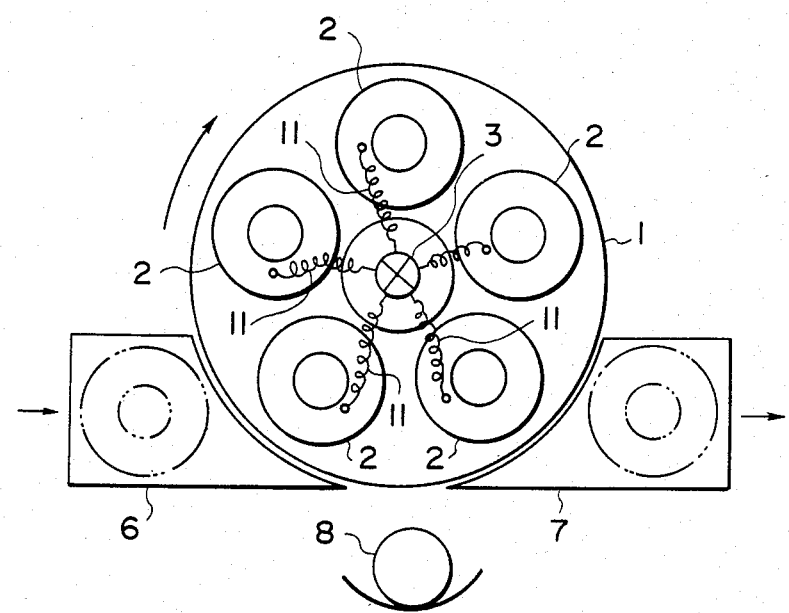
FIG. 3 is a schematic plan view showing an embodiment of the tire air pressure filling system according to the present invention.
Figure 4:
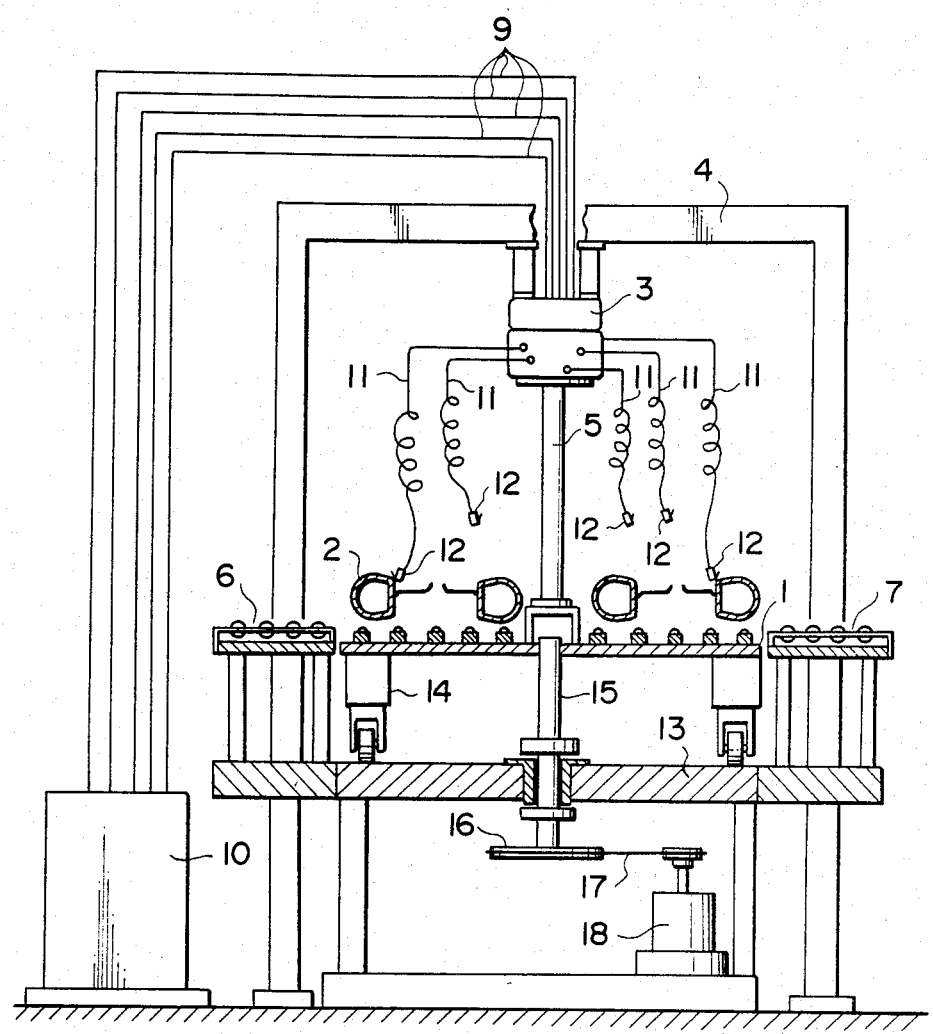
FIG. 4 is a schematic side view showing the present embodiment.

FIGS. 3 and 4 are a plan view and a side view showing a first embodiment of the tire air pressure filling system according to the present invention. The rotary table 1 is provided thereon with a space capable of receiving a plurality of tires, for example, five tires 2 in the circumferential direction thereof, or arranged in a circle, further provided thereon with rollers called ball casters, not shown, for smoothing the transfer of the tires 2. A rotary distribution joint 3, is held by supports 4 and 5 at the center of the rotary table 1, and this rotary distribution joint 3 is provided with five air in-ports and five air out-ports, respectively, not shown. Disposed adjacent to this rotary table 1 are a tire carry-in bed 6 and a tire carry-out bed 7, to the upper surfaces of which rollers called free rollers, not shown, for smoothing the transfer of the tires 2 are secured. Reference numeral 8 indicates a worker.

Connected to the upper portion of the five shaft rotary distribution joint 3 are air pipes 9, the other ends of these air pipes 9 are connected to a pressure control device 10. This pressure control device 10 is provided thereon with a tire selection switch, not shown, for allowing selection of pressure for tires with tubes or tubeless tires. Five air hoses 11 are connected to this five port rotary distribution joint 3, the chucks 12 to be connected to valves of the tires 2 are secured at the free ends of the hoses 11.

The support 4 fixes the five port rotary distribution joint 3 in a suspended state, and the support 5 supports the five port rotary distribution joint 3 from below. The other end of the support 5 is fixed to the rotary table 1 The rotary table 1, the carry-in bed 6 and the carry-out bed 7 are supported by a frame 13; particularly, the rotary table 1 is provided at the undersurface thereof with wheels 14 and a shaft 15 connected to the center of the table 1 for rotatably supporting the rotary table 1. A driving force of an electric motor 18 is imparted to the shaft 15 through a sprocket 16 and a chain 17. To allow the air hoses 11 to rotate in unison with rotation of the rotary table 1, the air hoses 11 are separated from the air pipes 9 by the five port rotary distribution joint 3.

Figure 5:
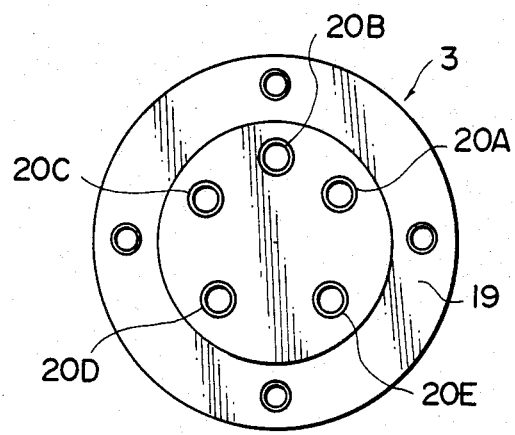
FIG. 5 is a detailed plan view showing the rotary distribution joint 3 used in the present embodiment.
Figure 6:
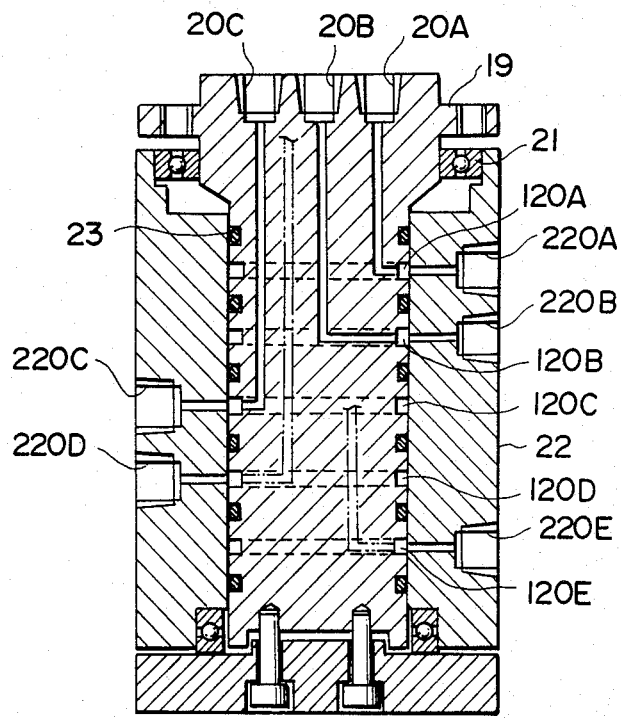
FIG. 6 is a vertical cross sectional view showing the rotary distribution joint 3.

FIGS. 5 and 6 show the rotary distribution joint 3 in detail. A stator 19 is inserted into a rotatable cylindrical shell 22 through a bearing 21 in the shell 22. The stator 19 has at its upper surface five ports 20A through 20E, which are in turn communicated with five circumferential grooves 120A through 120E at an outer periphery of the stator 19, respectively. The shell also has corresponding five ports 220A through 220E, which are opposed to the respective grooves 120A through 120E. Therefore, the ports 20A through 20E are communicated with the ports 220A through 220E. Reference numeral 23 designates an O-ring for sealing between the stator and shell.

Description will now be given of the operation of the above embodiment. The operator 8 removes a cap coupled to the valve of a tire 2, and connects the corresponding hose 11 to the valve. Next, selection is made as to whether the tire is one with tube or tubeless, and a starting switch, not shown, is turned "ON" to perform the control of air pressure in the tire 2. Simultaneously with this, the rotary table 1 is rotated by one fifth of a revolution in a direction indicated by an arrow in FIG. 3, to thereby transfer the tire 2. When the above-described operation is repeated, then the tire which has been carried in first is completed in its air pressure control and returned to the operator. Then, the hose 11 is removed from the tire 2, the cap, which has been removed, is applied on the tire, and the tire is carried onto the tire carry-out bed 7, and transferred to the succeeding stage of the line. The series of actions as described above are repeated, whereby the tire 2 is filled up with air pressure.

Figure 7:
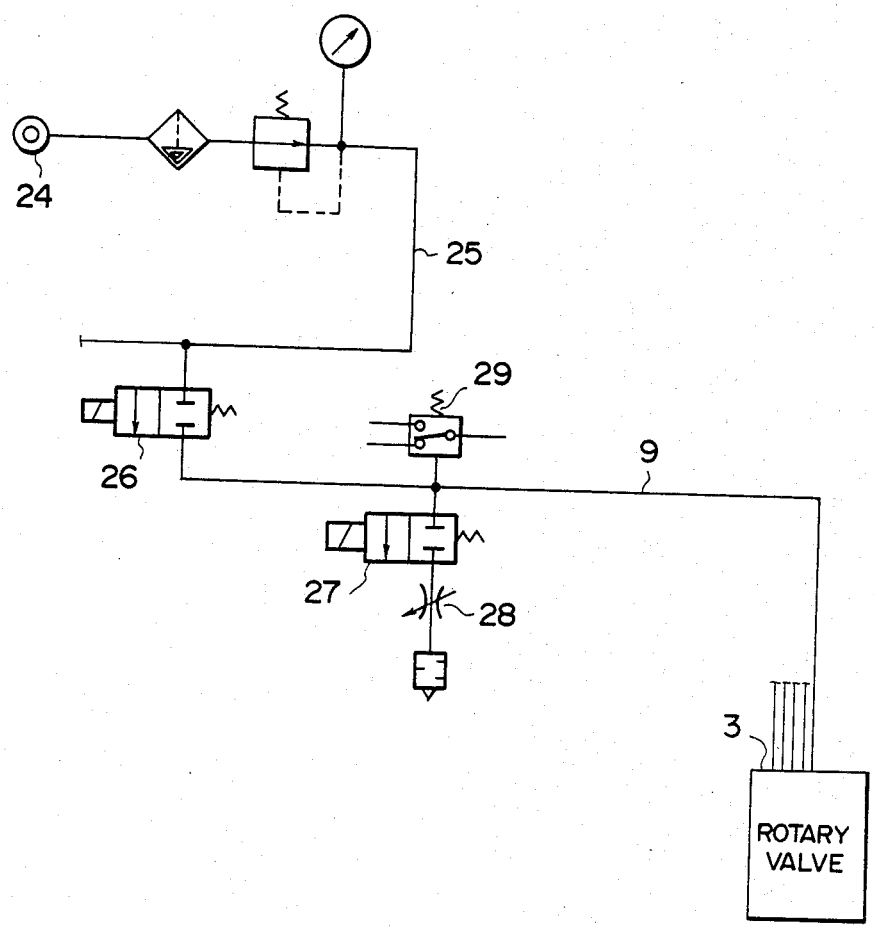
FIG. 7 is a schematic circuit arrangement view showing one example of the air control circuit used in the present embodiment.

FIG. 7 shows an example of an air control circuit in the above embodiment, in which the air control circuit relating to the port 20A is typically illustrated. However, other ports 20B~20E also have air control circuits similar to the above, respectively. Connected to a pipe 25 connected to an air source 24 is a solenoid valve 26, the other end of which is connected to the rotary distribution joint 3 through one of the air pipes 9. Connected to the intermediate portion of this air pipes 9 is a solenoid valve 27, the other end of which is communicated with atmosphere through a throttle valve 28. The solenoid valve 27 is also connected to a pressure switch 29.

Description will hereunder be given of the operation of the air control circuit described above. Firstly, the pressure switch 29 is set to a specified pressure (in this case, 1.8 Kg/cm$^2$). Subsequently, in the case of the tire with tube, a selection switch, not shown, is changed over to "tire with tube" and a starting switch, not shown, is turned "ON", whereby the solenoid valve 26 is turned "ON" to communicate the air source 24 and the air pipe 9 with each other, so that the tire can be filled up with air pressure. Furthermore, simultaneously with the turn-on of the solenoid valve 26, a timer, which has been previously set to obtain a tire internal pressure of about 2.0 Kg/cm$^2$, operates. Thereafter, this timer turns the solenoid valve "OFF" when the pressure reaches about 2.0 Kg/cm$^2$. Thereafter, the solenoid valve 27 is turned "ON" to communicate the air pipe 9 with atmosphere, whereby the air pressure in the tire is progressively released into atmosphere through the throttle valve 28. This release of air is continued until the internal pressure in the solenoid valve 27 becomes 1.8 Kg/cm$^2$. When the pressure switch 29 detects the internal pressure of the solenoid valve 27 to be 1.8 Kg/cm$^2$, this solenoid valve 27 is turned "OFF", whereby a completion lamp, not shown, is turned "ON", so that the completion of the air filling is notified. This operation lasts about 30 sec. for each tire.

Description will now be given of an operation of filling a tubeless tire with air. Since the tubeless tire has been filled with air pressure of 3.5~4.0 Kg/cm$^2$ in advance, the extraction of the air pressure down to 1.8 Kg/cm$^2$ is to be performed. The tubeless tire has been filled with air pressure by means of an air inflater in the preceding stage of the line. Firstly, the tire selection switch is changed over to "tubeless tire" to turn the starting switch "ON", whereby the solenoid valve 27 is turned "ON", so that the air piping 9 can be communicated with atmosphere. With this arrangement, the air pressure in the tire is progressively released into the atmosphere through the throttle valve 28. This release of air pressure is continued until the pressure switch 29 detects the air pressure to be 1.8 Kg/cm$^2$. When the pressure switch 29 detects the air pressure of 1.8 Kg/cm$^2$, the solenoid valve 27 is turned "OFF" for completion. This operation lasts about 60 sec. for each tire.

In summary, according to this embodiment, when the worker 8 connects the air hose 11 from the rotary valve 3 to the tire 2 mounted onto the rotary table 1, the rotary table 1 rotates to transfer the tire 2 a full turn, during which turn, the filling or extracting of air is performed through the air hose 11, and the tire 2 thus filled with a predetermined air pressure is returned to the worker 8 again. With the above-described arrangement, the mounting or detaching operation of the air hose to or from the tire 2 can be performed at a predetermined position, and therefore, necessity for the worker to walk can be eliminated to save a waste of working time, and the filling or extracting of air to or from the five tires 2 can be performed on the rotary table 1. As a result, the present embodiment offers the advantages that the working time for filling or discharging air pressure to or from the tires can be reduced to a considerable extent to improve the productivity, and the operator's work at the predetermined position makes it possible to alleviate the work load of the operator. Moreover, the arrangement of the five tires 2 on the rotary table 1 can offer the advantage of reducing the installation space of the system.

What is claimed is:

1. A method for inflawing tires in a moving line of tires to a predetermined pressure, the method comprising delivering tires one by one at a work station to successive ones of a predetermined number of angularly spaced tire-receiving locations on a rotating table;

connecting a free end of a separate flexible air line to each tire as it is delivered to the rotating table;

connecting each air line through an individual stationary conduit via a rotary joint to a stationary source of air maintained at a pressure substantially greater than a desired final pressure in the tire for a single fixed time period, said time period being preselected to assure inflation of the tire to a pressure above said desired final pressure;

shutting the connection from the stationary conduit to the source of air at the end of said predetermined fixed time period;

opening a connection from the stationary conduit to the atmosphere;

sensing a pressure in the air line corresponding to the instantaneous pressure in the tire;

shutting the connection from the stationary conduit to the atmosphere in response to a sensed pressure in the air line equal to said desired final pressure;

disconnecting the air line from the tire as the tire on the rotating table reapproaches the work station; and removing the properly inflated tire from the table.

2. Apparatus for inflating tires in a moving line to a predetermined pressure, the apparatus comprising:

a circular table mounted for rotation in one direction about an axis perpendicular to the table and passing through the center thereof, the table having a predetermined plurality of angularly spaced locations for receiving a corresponding plurality of tires arranged in a circle;

an input conveyor having a discharge end disposed adjacent to the table for delivering tires one by one to successive ones of said locations as the table rotates;

an output conveyor having an entrance end disposed adjacent to the table and close to the discharge end of the input conveyor for receiving tires one by one from successive ones of said locations as the table rotates;

a rotary joint air distributor located on the axis of rotation of the table, said distributor having a fixed portion having a plurality of inlets equal to the plurality of tire receiving locations on the circular table, and a rotatable portion connected for rotation with the table and having an equal plurality of outlets, each outlet being in communication with the corresponding inlet on the fixed portion;

a separate pressure control apparatus for each tire, each pressure apparatus being connected to a coresponding inlet of the fixed portion of the air distributor, each pressure control apparatus including a first solenoid valve having an inlet connected to a source of air maintained at a pressure above a desired final pressure in each tire and an outlet connected to a line leading to the corresponding inlet on the fixed portion of the air distributor, a second solenoid valve having an inlet connected to said line from the outlet of the first solenoid valve and an outlet communicating with the atmosphere, and a pressure switch connected to said second solenoid valve and selectively responsive to the pressure at the inlet of said second solenoid valve for operating the second solenoid valve; and a plurality of flexible air hoses corresponding to said predetermined plurality of locations on the table, each air hose having a first end connected to a corresponding outlet on the rotatable portion of the air distributor and a second free end adapted to be connected to a tire disposed at the corresponding location on the table for delivering air to the tire from the source when the first solenoid valve is open and the second solenoid valve is shut and for venting air from the tire when the first solenoid valve is shut and the second solenoid valve is open.

* * * * *